US012091304B2

(12) United States Patent
Puszkiewicz et al.

(10) Patent No.: US 12,091,304 B2
(45) Date of Patent: Sep. 17, 2024

(54) OSCILLATING AXLE FOR LIFT DEVICE

(71) Applicant: Oshkosh Corporation, Oshkosh, WI (US)

(72) Inventors: Ignacy Puszkiewicz, Hagerstown, MD (US); Jihong Hao, Greencastle, PA (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/106,874

(22) Filed: Feb. 7, 2023

(65) Prior Publication Data

US 2023/0183050 A1    Jun. 15, 2023

Related U.S. Application Data

(63) Continuation of application No. 16/811,035, filed on Mar. 6, 2020, now Pat. No. 11,597,638.

(Continued)

(51) Int. Cl.
*B66F 9/075* (2006.01)
*B66F 11/04* (2006.01)
*B66F 17/00* (2006.01)

(52) U.S. Cl.
CPC ...... *B66F 9/07586* (2013.01); *B66F 9/07513* (2013.01); *B66F 9/07559* (2013.01); *B66F 11/044* (2013.01); *B66F 17/006* (2013.01)

(58) Field of Classification Search
CPC .............. B66F 9/07586; B66F 9/07516; B66F 9/07559; B66F 11/044; B66F 17/006;

(Continued)

(56) References Cited

U.S. PATENT DOCUMENTS 4,071,259 A    1/1978    Ernest
4,264,014 A *  4/1981    Hogg .................. B60G 17/005
                                             280/755

(Continued)

FOREIGN PATENT DOCUMENTS

EP    0 887 213 A2    12/1998
EP    1 698 497 A      9/2006
GB    2 358 839 A      8/2001

OTHER PUBLICATIONS

International Search Report and Written Opinion received in PCT application No. PCT/US2020/021326, Oshkosh Corporation, Jul. 30, 2020, 16 pages.

*Primary Examiner* — Karen Beck
(74) *Attorney, Agent, or Firm* — Foley & Lardner LLP

(57) ABSTRACT

A machine includes a chassis, a turntable coupled to the chassis, a boom coupled to the turntable, an axle, a first actuator, and a second actuator. The chassis has a first end and an opposing second end, and defines a longitudinal center axis. The turntable is selectively rotatable about a rotation axis. The axle is pivotally coupled to the first end of the chassis and configured to pivot about the longitudinal center axis. The first actuator is coupled to the first end of the chassis and positioned on a first side of the longitudinal center axis. The first actuator is extendable to selectively engage a first contact point on the axle. The second actuator is coupled to the first end of the chassis and positioned on an opposing second side of the longitudinal center axis. The second actuator is extendable to selectively engage a second contact point on the axle.

18 Claims, 7 Drawing Sheets

Related U.S. Application Data

(60) Provisional application No. 62/830,140, filed on Apr. 5, 2019.

(58) Field of Classification Search
CPC .......... B60G 2300/022; B60G 2300/06; B60G 2400/0511; B60G 2400/0512; B60G 2400/60; B60G 2400/64; B60G 9/02
See application file for complete search history.

(56) References Cited

U.S. PATENT DOCUMENTS

| | | | |
|---|---|---|---|
| 4,979,588 A | 12/1990 | Pike et al. | |
| 5,639,119 A * | 6/1997 | Plate | B62D 49/08 |
| | | | 280/124.112 |
| 5,813,697 A * | 9/1998 | Bargenquast | E02F 9/2257 |
| | | | 280/6.154 |
| 5,934,409 A | 8/1999 | Citron et al. | |
| 6,098,823 A * | 8/2000 | Yahiaoui | B66F 11/044 |
| | | | 212/197 |
| 6,126,178 A * | 10/2000 | Chino | B60G 17/005 |
| | | | 280/6.154 |
| 6,317,919 B1 | 11/2001 | Dahlin et al. | |
| 6,516,914 B1 | 2/2003 | Andersen et al. | |
| 6,561,718 B1 | 5/2003 | Archer et al. | |
| 6,764,085 B1 | 7/2004 | Anderson | |
| 6,779,806 B1 | 8/2004 | Breitbach et al. | |
| 6,883,815 B2 | 4/2005 | Archer | |
| 6,976,688 B2 | 12/2005 | Archer et al. | |
| 7,207,582 B2 | 4/2007 | Siebers et al. | |
| 7,472,914 B2 | 1/2009 | Anderson et al. | |
| 8,333,390 B2 | 12/2012 | Linsmeier et al. | |
| 8,376,077 B2 | 2/2013 | Venton-Walters | |
| 8,465,025 B2 | 6/2013 | Venton-Walters et al. | |
| 8,596,648 B2 | 12/2013 | Venton-Walters et al. | |
| 8,764,029 B2 | 7/2014 | Venton-Walters et al. | |
| 8,801,017 B2 | 8/2014 | Ellifson et al. | |
| 8,876,133 B2 | 11/2014 | Ellifson | |
| 8,955,859 B1 | 2/2015 | Richmond et al. | |
| 8,955,880 B2 | 2/2015 | Malcolm et al. | |
| 8,991,834 B2 | 3/2015 | Venton-Walters et al. | |
| 8,991,840 B2 | 3/2015 | Zuleger et al. | |
| 9,016,703 B2 | 4/2015 | Rowe et al. | |
| 9,045,014 B1 | 6/2015 | Verhoff et al. | |
| 9,291,230 B2 | 3/2016 | Ellifson et al. | |
| 9,327,576 B2 | 5/2016 | Ellifson | |
| 9,329,000 B1 | 5/2016 | Richmond et al. | |
| 9,434,321 B2 | 9/2016 | Perron et al. | |
| 9,656,640 B1 | 5/2017 | Verhoff et al. | |
| 9,669,679 B2 | 6/2017 | Zuleger et al. | |
| 9,688,112 B2 | 6/2017 | Venton-Walters et al. | |
| 9,764,613 B2 | 9/2017 | Rowe et al. | |
| 9,809,080 B2 | 11/2017 | Ellifson et al. | |
| 9,890,024 B2 | 2/2018 | Hao et al. | |
| 10,144,389 B2 | 12/2018 | Archer et al. | |
| 10,167,027 B2 | 1/2019 | Perron et al. | |
| 10,221,055 B2 | 3/2019 | Hao et al. | |
| 10,336,596 B2 | 7/2019 | Puszkiewicz et al. | |
| 10,369,860 B2 | 8/2019 | Ellifson et al. | |
| 10,392,056 B2 | 8/2019 | Perron et al. | |
| 10,407,288 B2 | 9/2019 | Hao et al. | |
| 10,421,332 B2 | 9/2019 | Venton-Walters et al. | |
| 10,434,995 B2 | 10/2019 | Verhoff et al. | |
| 10,457,533 B2 * | 10/2019 | Puszkiewicz | B66F 9/07559 |
| 10,464,389 B2 | 11/2019 | Zuleger et al. | |
| 10,611,204 B1 | 4/2020 | Zhang et al. | |
| 10,632,805 B1 | 4/2020 | Rositch et al. | |
| 10,723,282 B2 | 7/2020 | Perron et al. | |
| 10,752,075 B1 | 8/2020 | Shukla et al. | |
| 2004/0041463 A1 | 3/2004 | Gabella et al. | |
| 2011/0288726 A1 * | 11/2011 | Mackin | B60G 17/005 |
| | | | 280/93.5 |
| 2017/0291802 A1 | 10/2017 | Hao et al. | |
| 2019/0185301 A1 | 6/2019 | Hao et al. | |
| 2019/0276102 A1 | 9/2019 | Zuleger et al. | |
| 2019/0322512 A1 | 10/2019 | Puszkiewicz et al. | |
| 2019/0337348 A1 | 11/2019 | Venton-Walters et al. | |
| 2019/0337350 A1 | 11/2019 | Ellifson et al. | |
| 2019/0344838 A1 | 11/2019 | Perron et al. | |
| 2019/0351883 A1 | 11/2019 | Verhoff et al. | |
| 2019/0352157 A1 | 11/2019 | Hao et al. | |
| 2019/0381990 A1 | 12/2019 | Shukla et al. | |
| 2020/0062071 A1 | 2/2020 | Zuleger et al. | |
| 2020/0094671 A1 | 3/2020 | Wildgrube et al. | |
| 2020/0140248 A1 | 5/2020 | Hackenberg et al. | |
| 2020/0140249 A1 * | 5/2020 | Hackenberg | B66F 13/00 |
| 2020/0317486 A1 | 10/2020 | Puszkiewicz et al. | |
| 2021/0008945 A1 | 1/2021 | Perrin | |

* cited by examiner

OSCILLATING AXLE FOR LIFT DEVICE

CROSS-REFERENCE TO RELATED PATENT APPLICATIONS

This application is a continuation of U.S. patent application Ser. No. 16/811,035, filed Mar. 6, 2020, which claims the benefit of and priority to U.S. Provisional Patent Application No. 62/830,140, filed Apr. 5, 2019, both of which are incorporated herein by reference in their entireties.

BACKGROUND

Traditional boom lifts may include a chassis, a turntable coupled to the chassis, and a boom assembly. The boom assembly may include one or more boom sections that are pivotally connected to the turntable. A lift cylinder elevates the one or more boom sections relative to the turntable, thereby elevating an implement (e.g., work platform, forks, etc.) that is coupled to the boom assembly.

SUMMARY

One embodiment relates to a lift machine. The lift machine includes a chassis, a turntable coupled to the chassis, a boom coupled to the turntable, an axle, a first actuator, and a second actuator. The chassis has a first end and an opposing second end. The chassis defines a longitudinal center axis. The turntable is selectively rotatable about a rotation axis. The axle is pivotally coupled to the first end of the chassis. The axle is configured to pivot about the longitudinal center axis. The first actuator is coupled to the first end of the chassis and positioned on a first lateral side of the longitudinal center axis. The first actuator is extendable to selectively engage a first contact point on the axle. The second actuator is coupled to the first end of the chassis and positioned on an opposing second lateral side of the longitudinal center axis. The second actuator is extendable to selectively engage a second contact point on the axle.

Another embodiment relates to a machine. The machine includes a chassis, an axle, a first actuator, a second actuator, and a controller. The chassis has a first end and an opposing second end. The chassis defines a longitudinal center axis. The axle is pivotally coupled to the first end of the chassis. The axle is configured to pivot about the longitudinal center axis. The first actuator is coupled to the first end of the chassis and positioned on a first lateral side of the longitudinal center axis. The first actuator is extendable to selectively engage a first contact point on the axle. The second actuator is coupled to the first end of the chassis and positioned on an opposing second lateral side of the longitudinal center axis. The second actuator is extendable to selectively engage a second contact point on the axle. The controller is configured to selectively control extension and retraction of the first actuator and the second actuator such that: (a) the first actuator and the second actuator are fully retracted where ends thereof are disengaged from the first contact point and the second contact point of the axle to permit free oscillation of the axle through a first angle range, (b) at least one of the first actuator or the second actuator is at least partially extended where the ends thereof do not actively engage the first contact point and the second contact point of the axle and thereby function as bump stops to permit free oscillation of the axle through a second angle range that is less than the first angle range, (c) the first actuator and the second actuator are extended to actively engage the first contact point and the second contact point of the axle to lock the axle at a selected angle, and (d) the first actuator and the second actuator are actively extended and retracted to adaptively adjust a current angle of the axle based on operational parameters of the machine.

Still another embodiment relates to a machine. The machine includes a chassis, an axle, a pin, a first actuator, and a second actuator. The chassis has a first end and an opposing second end. The chassis includes an axle housing positioned at the first end thereof. The axle housing includes a back plate, a first side plate, a second side plate, a front plate, and a top plate. The back plate defines a first aperture. The first side plate extends from a first lateral side of the back plate. The first side plate defines a first axle notch. The second side plate extends from an opposing second lateral side of the back plate. The second side plate defines a second axle notch. The front plate is spaced from the back plate and extending between the first side plate and the second side plate. The front plate defines a second aperture. The top plate extending between the back plate, the front plate, the first side plate, and the second side plate. The top plate defines a first actuator passage proximate the first side plate and a second actuator passage positioned proximate the second side plate. The axle includes a pivot extending vertically upward from a center thereof. The pivot defining a passage that aligns with the first aperture and the second aperture. The pin extends through the first aperture, the passage, and the second aperture to pivotably couple the axle to the axle housing with opposing ends of the axle extending through the first axle notch and the second axle notch. The first actuator is coupled to the first side plate and at least partially extending through the first actuator passage. The first actuator is extendable to selectively engage a first contact point on the axle. The second actuator is coupled to the second side plate and at least partially extending through the second actuator passage. The second actuator is extendable to selectively engage a second contact point on the axle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a machine (e.g., a lift device, etc.) includes a chassis, a boom, a front axle, a rear axle, and a leveling system. At least one of the front axle or the rear axle is configured to pivot about a longitudinal center axis of the chassis. The leveling system is operable in various modes of operation based on (i) a load on the front axle and/or the rear axle, (ii) a tilt angle of the chassis, (iii) whether the machine is being driven or not being driven, and (iv) a position of the boom relative to a nominal position. The leveling system may be (i) actively controllable to modulate the pivot angle of at least one of the front axle or the rear axle, (ii) controllable to lock the pivot angle of at least one of the front axle or the rear axle, or (iii) controllable to permit free oscillation of at least one of the front axle or the rear axle based on the mode of operation. According to an exemplary embodiment, the leveling system of the present disclosure is configured to improve wheel ground following capabilities when the boom is "out-of-transport" without sacrificing the wheel ground following capabilities when the boom is "in-transport." The leveling system is configured to facilitate satisfying the EN280 standard pothole test and improve traction capabilities.

The terms "front," "rear," "left," and "right" as used herein are relative terms to provide reference and not necessarily intended to be limiting. "Active control" refers to engaging valves, pumps, motors, etc. with a processing circuit or controller to selectively vary the extension, retraction, etc. of an actuator (e.g., a hydraulic cylinder, etc.).

Figure 1:
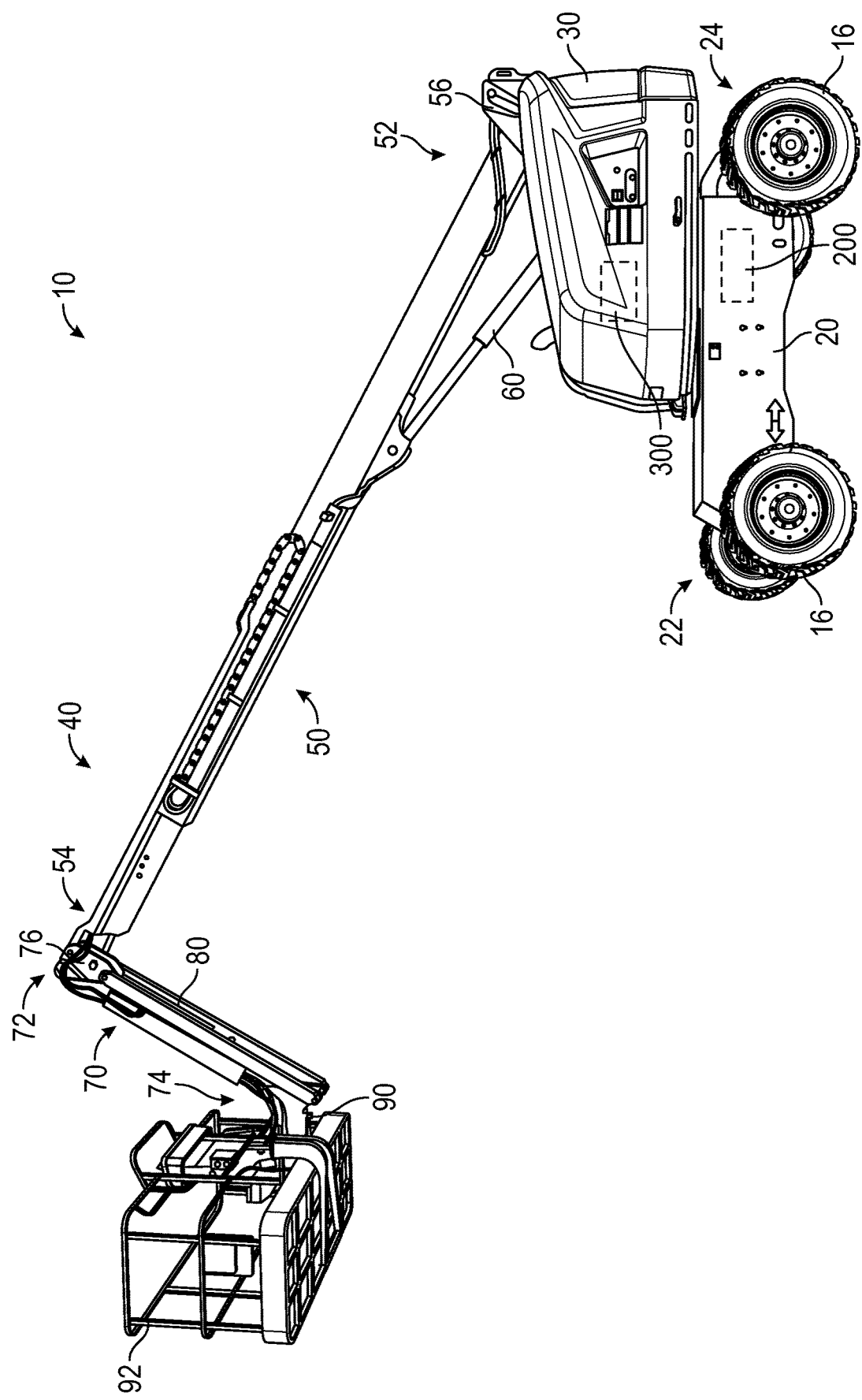
FIG. 1 is a perspective view of a lift device having a chassis, a leveling system, a turntable, and a boom, according to an exemplary embodiment.

As shown in FIGS. 1-3 and 5-7, a machine, shown as lift device 10, includes a chassis, shown as lift base 20. In some embodiments, the lift device 10 is an aerial work platform, a telehandler, a boom lift, a scissor lift, and/or still another type of lift device. In other embodiments, the lift device 10 is another type of machine or vehicle (e.g., a fire apparatus, a military vehicle, a fire apparatus, an airport rescue firefighting ("ARFF") truck, a boom truck, a refuse vehicle, a fork lift, etc.). As shown in FIG. 1, the lift base 20 supports a rotatable structure, shown as turntable 30, and a boom assembly, shown as boom 40. According to an exemplary embodiment, the turntable 30 is rotatable relative to the lift base 20. According to an exemplary embodiment, the turntable 30 includes a counterweight positioned at a rear of the turntable 30. In other embodiments, the counterweight is otherwise positioned and/or at least a portion of the weight thereof is otherwise distributed throughout the lift device 10 (e.g., on the lift base 20, on a portion of the boom 40, etc.).

As shown in FIGS. 1-7, a first end, shown as front end 22, and an opposing second end, shown as rear end 24, of the lift base 20 is supported by a plurality of tractive elements, shown as tractive elements 16. According to the exemplary embodiment shown in FIGS. 1,2, and 4-7, the tractive elements 16 include wheels. In other embodiments, the tractive elements 16 include a track element. According to an exemplary embodiment, the lift device 10 includes a plurality of driver actuators (e.g., electric wheel motors, etc.). Each of the drive actuators may be positioned to facilitate independently and selectively driving one of the tractive elements 16 to move the lift device 10. In some embodiments, the lift device 10 only includes front drive actuators positioned to drive the front tractive elements 16. In some embodiments, the lift device 10 only includes rear drive actuators positioned to drive the rear tractive elements 16. In some embodiments, the lift device 10 includes drive actuators positioned to drive the front tractive elements 16 and the rear tractive elements 16. In some embodiments, the lift device 10 includes a plurality of brakes (e.g., one for each tractive element 16, etc.) positioned to independently and selectively restrict rotation of each of the tractive elements 16.

As shown in FIG. 1, the boom 40 includes a first boom section, shown as lower boom 50, and a second boom section, shown as upper boom 70. In other embodiments, the boom 40 includes a different number and/or arrangement of boom sections (e.g., one, three, etc.). According to an exemplary embodiment, the boom 40 is an articulating boom assembly. In one embodiment, the upper boom 70 is shorter in length than lower boom 50. In other embodiments, the upper boom 70 is longer in length than the lower boom 50. According to another exemplary embodiment, the boom 40 is a telescopic, articulating boom assembly. By way of example, the lower boom 50 and/or the upper boom 70 may include a plurality of telescoping boom sections that are configured to extend and retract along a longitudinal centerline thereof to selectively increase and decrease a length of the boom 40.

As shown in FIG. 1, the lower boom 50 has a first end (e.g., a lower end, etc.), shown as base end 52, and an opposing second end, shown as intermediate end 54. The base end 52 of the lower boom 50 is pivotally coupled (e.g., pinned, etc.) to the turntable 30 at a joint, shown as lower boom pivot 56. As shown in FIG. 1, the boom 40 includes a first actuator (e.g., pneumatic cylinder, electric actuator, hydraulic cylinder, etc.), shown as lower lift cylinder 60. The lower lift cylinder 60 has a first end coupled to the turntable 30 and an opposing second end coupled to the lower boom 50. According to an exemplary embodiment, the lower lift cylinder 60 is positioned to raise and lower the lower boom 50 relative to the turntable 30 about the lower boom pivot 56.

As shown in FIG. 1, the upper boom 70 has a first end, shown as intermediate end 72, and an opposing second end, shown as implement end 74. The intermediate end 72 of the upper boom 70 is pivotally coupled (e.g., pinned, etc.) to the intermediate end 54 of the lower boom 50 at a joint, shown as upper boom pivot 76. As shown in FIG. 1, the boom 40 includes an implement, shown as platform assembly 92, coupled to the implement end 74 of the upper boom 70 with an extension arm, shown as jib arm 90. In some embodiments, the jib arm 90 is configured to facilitate pivoting the platform assembly 92 about a lateral axis (e.g., pivot the platform assembly 92 up and down, etc.). In some embodiments, the jib arm 90 is configured to facilitate pivoting the platform assembly 92 about a vertical axis (e.g., pivot the platform assembly 92 left and right, etc.). In some embodiments, the jib arm 90 is configured to facilitate extending and retracting the platform assembly 92 relative to the implement end 74 of the upper boom 70. As shown in FIG. 1, the boom 40 includes a second actuator (e.g., pneumatic cylinder, electric actuator, hydraulic cylinder, etc.), shown as upper lift cylinder 80. According to an exemplary embodiment, the upper lift cylinder 80 is positioned to actuate (e.g., lift, rotate, elevate, etc.) the upper boom 70 and the platform assembly 92 relative to the lower boom 50 about the upper boom pivot 76.

According to an exemplary embodiment, the platform assembly 92 is a structure that is particularly configured to support one or more workers. In some embodiments, the platform assembly 92 includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly 92 includes a control panel to control operation of the lift device 10 (e.g., the turntable 30, the boom 40, etc.) from the platform assembly 92. In other embodiments, the platform assembly 92 includes or is replaced with an accessory and/or tool (e.g., forklift forks, etc.).

Figure 2:
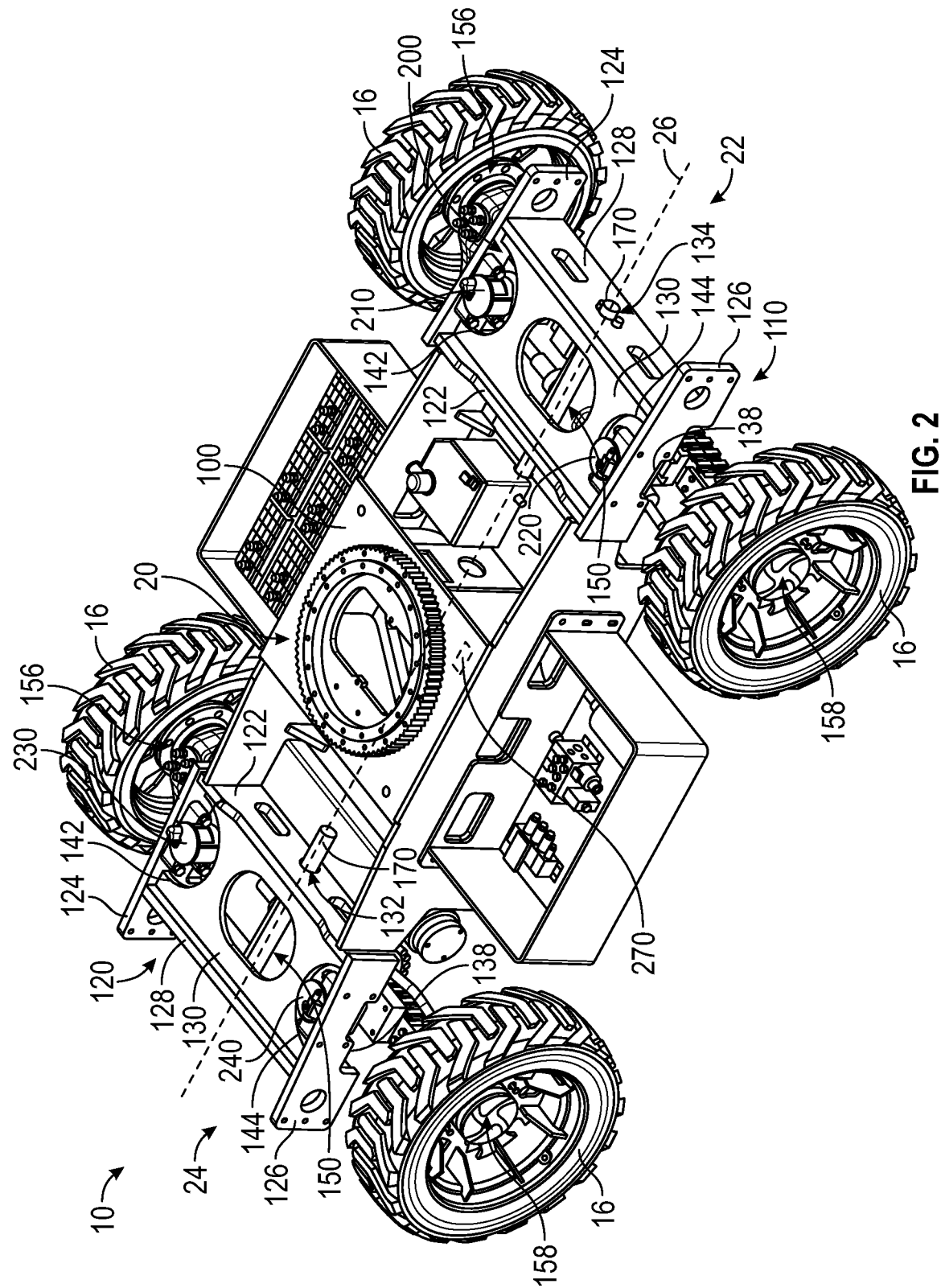
FIG. 2 is a front perspective view of the chassis and the leveling system of the lift device of FIG. 1, according to an exemplary embodiment.
Figure 3:
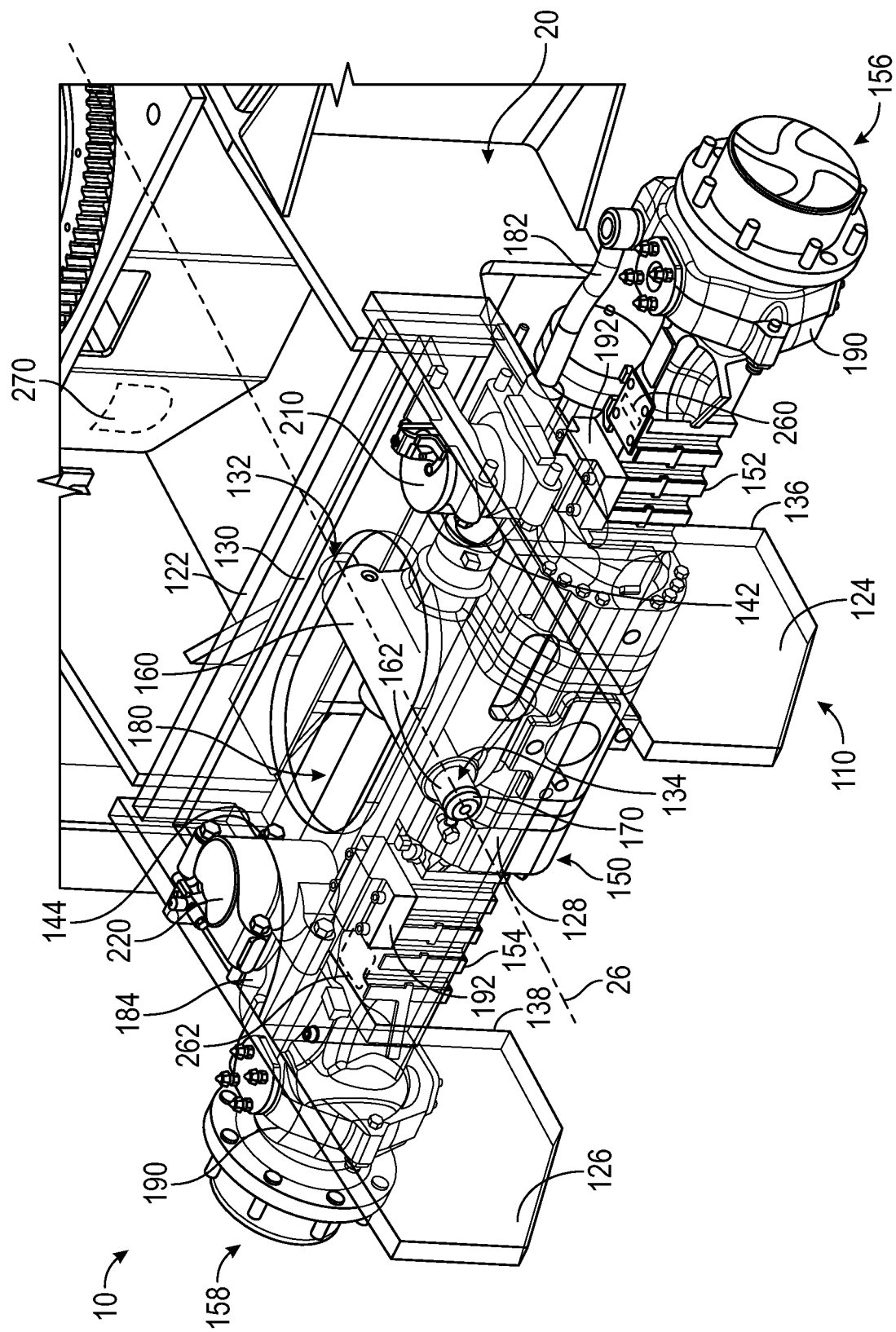
FIG. 3 is a detailed front perspective view of the chassis and the leveling system of the lift device of FIG. 1, according to an exemplary embodiment.

As shown in FIGS. 2 and 3, the lift base 20 includes a first portion, shown as turntable support 100, that supports and facilitates pivotally coupling the turntable 30 to the lift base 20; a second portion, shown as front axle housing 110, extending from the front end 22 of the turntable support 100; and a third portion, shown as rear axle housing 120, extending from the rear end 24 of the turntable support 100. According to the exemplary embodiment shown in FIG. 2, the front axle housing 110 and the rear axle housing 120 are the same or substantially the same. In other embodiments (e.g., an embodiment where an axle of the lift device 10 is a fixed axle, etc.), the front axle housing 110 and the rear axle housing 120 are different.

As shown in FIGS. 2 and 3, each of the front axle housing 110 and the rear axle housing 120 includes a first lateral plate, shown as back plate 122, coupled to the turntable support 100 (e.g., the front end 22 of the lift base 20, the rear end 24 of the lift base 20, etc.); a first longitudinal plate, shown as left side plate 124, extending from a left side of the back plate 122; a second longitudinal plate, shown as right side plate 126, extending from a right side of the back plate 122; a second lateral plate, shown as front plate 128, spaced from the back plate 122 and extending between the left side plate 124 and the right side plate 126; and a top plate, shown as top plate 130, extending between the back plate 122, the left side plate 124, the right side plate 126, and the front plate 128. The back plate 122, the left side plate 124, the right side plate 126, the front plate 128, and the top plate 130 may thereby form a box shape of the front axle housing 110 and/or the rear axle housing 120 (e.g., with a bottom thereof open, etc.).

As shown in FIGS. 2 and 3, each of the back plates 122 defines a first aperture, shown as back aperture 132, and each of the front plates 128 defines a second aperture, shown as front aperture 134, positioned along a longitudinal central axis, shown as central axis 26, defined by the lift base 20. As shown in FIG. 3, each of the left side plates 124 defines a first notch, shown as left axle arch 136. As shown in FIGS. 2 and 3, each of the right side plates 126 defines a second notch, shown as right axle arch 138. As shown in FIGS. 2 and 3, each of the top plates 130 defines (i) a first cutout, shown as left actuator passage 142, positioned proximate (e.g., adjacent, etc.) the left side plate 124 and (ii) a second cutout, shown as right actuator passage 144, positioned proximate (e.g., adjacent, etc.) the right side plate 126.

As shown in FIGS. 2-7, the lift device 10 includes a pair of axles, shown as axles 150. According to the exemplary embodiment shown in FIGS. 2,3, and 5-7, a first axle of the axles 150 (e.g., a front axle, etc.) is pivotally coupled to the front axle housing 110 and a second axle of the axles 150 (e.g., a rear axle, etc.) is pivotally coupled to the rear axle housing 120. In other embodiments, one of the first axle or the second axle of the axles 150 is fixed to the lift base 20 (see, e.g., FIG. 4). For example, the fixed axle can be directly bolted to the lift base 20 or integrated with the lift base 20 (e.g., as part of the frame weldment, etc.). According to an exemplary embodiment, the axles 150 are solid axles that span across the lift base 20. As shown in FIGS. 2, 3, and 5-7, each of the axles 150 includes a first extension, shown as left half-shaft 152, extending in a first lateral direction from a center of the axles 150 and ending in a first wheel adapter, shown as left wheel hub 156; a second extension, shown as right half-shaft 154, extending in an opposing second lateral direction from the center of the axles 150 and ending in a second wheel adapter, shown as right wheel hub 158; and a protrusion, shown as pivot 160, extending vertically upward from the center of the axles 150 and defining a passage, shown as pin slot 162. As shown in FIG. 2, the left wheel hubs 156 and the right wheel hubs 158 are configured to facilitate releasably coupling the tractive elements 16 to the axles 150. As shown in FIGS. 2 and 3, each of the pivots 160 is configured to interface with a respective pair of the back plate 122 and the front plate 128 such that the back aperture 132, the front aperture 134, and the pin slot 162 align and cooperatively receive a pin, shown as axle pin 170, that pivotally couples each of the axles 150 to the lift base 20 (i.e., the front axle housing 110 and the rear axle housing 120, respectively). As shown in FIG. 3, the left half-shafts 152 extend through the left axle arches 136 of the left side plates 124 and the right half-shafts 154 extend through the right axle arches 138 of the right side plates 126.

Figure 8:
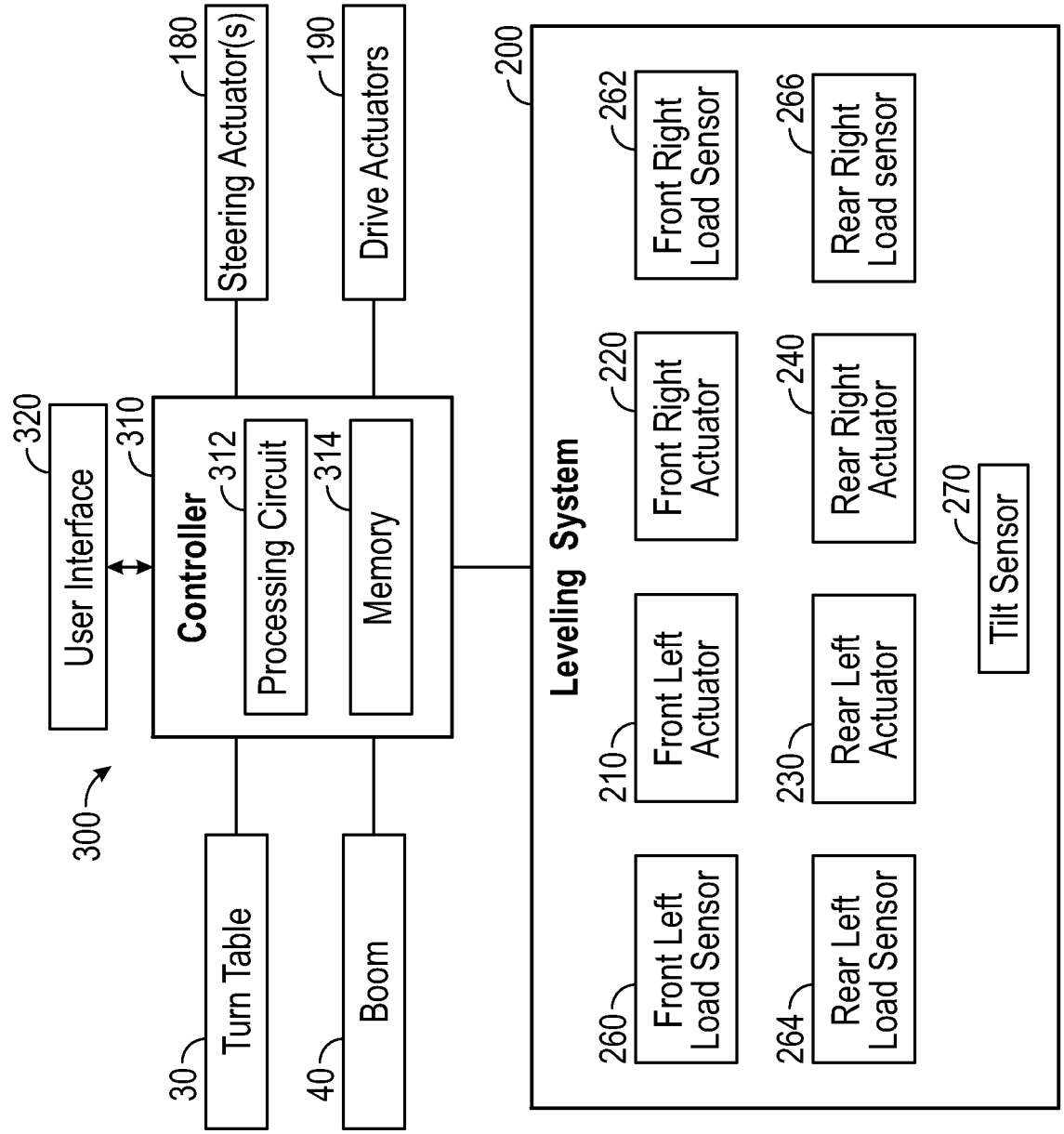
FIG. 8 is a schematic block diagram of a control system of the lift device of FIG. 1, according to an exemplary embodiment.

As shown in FIGS. 3 and 8, the lift device 10 includes a steering actuator, shown as steering actuator 180, having (i) a first end, shown as left end 182, coupled to the left wheel hub 156 and (ii) an opposing second end, shown as right end 184, coupled to the right wheel hub 158. According to an exemplary embodiment, the steering actuator 180 is configured to pivot the left wheel hub 156 and the right wheel hub 158 relative to the left half-shaft 152 and the right half-shaft 154, respectively, to facilitate steering the lift device 10. According to an exemplary embodiment, the steering actuator 180 is or includes a hydraulic cylinder. In other embodiments, the steering actuator 180 is or includes another type of actuator (e.g., a pneumatic cylinder, an electric actuator, etc.). In other embodiments, the steering actuator 180 includes two independent steering actuators to facilitate independently steering the left wheel hub 156 and the right wheel hub 158. In some embodiments, the lift device 10 includes a front steering actuator 180 and a rear steering actuator 180 to provide four-wheel steering. In some embodiments, the lift device 10 includes only one of the front steering actuator 180 or the rear steering actuator 180 to provide two-wheel front steering or two-wheel rear steering. In other embodiments, the lift device 10 does not includes the steering actuators 180, but, rather, the lift device 10 implements skid-steering.

As shown in FIGS. 3 and 8, the lift device 10 includes drive actuators, shown as drive actuators 190, positioned between (i) the left half-shaft 152 and the left wheel hub 156 and (ii) the right half-shaft 154 and the right wheel hub 158. According to an exemplary embodiment, the drive actuators 190 are configured to facilitate independently driving the tractive elements 16. According to an exemplary embodiment, the drive actuators 190 are electric actuators (e.g., motors, etc.). In some embodiments, the lift device 10 includes front drive actuators 190 and rear drive actuator 190 to provide four-wheel drive. In some embodiments, the lift device 10 includes only one of the front drive actuators 190 or the rear drive actuator 190 to provide front-wheel drive or rear-wheel drive.

Figure 4:
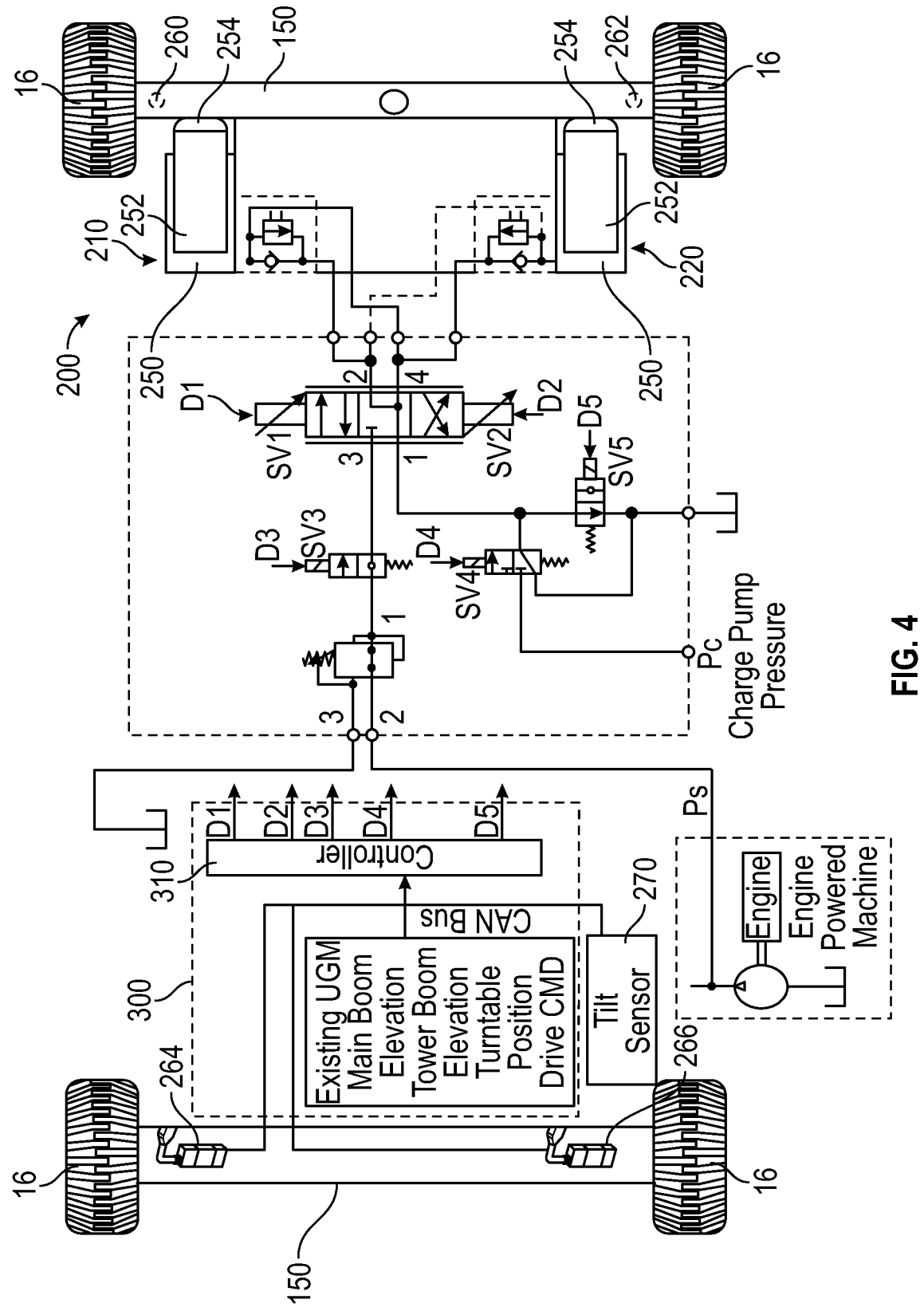
FIG. 4 is a schematic diagram of the leveling system of the lift device of FIG. 1, according to an exemplary embodiment.

As shown in FIGS. 1-8, the lift device 10 includes a leveling assembly, shown as leveling system 200. According to an exemplary embodiment, the leveling system 200 is configured to facilitate maintaining the lift base 20, the turntable 30, and/or the platform assembly 92 of the lift device 10 level relative to gravity (e.g., while stationary, while being driven on uneven and/or sloped ground, while operating the boom 40, etc.). As shown in FIGS. 2-8, the leveling system 200 includes a first leveling actuator, shown as front left actuator 210, and a second leveling actuator, shown as front right actuator 220. In some embodiments, as shown in FIGS. 2 and 5-8, the leveling system 200 includes a third leveling actuator, shown as rear left actuator 230, and a fourth leveling actuator, shown as rear right actuator 240. In some embodiments (e.g., embodiments where one of the axles 150 is fixed, etc.), as shown in FIG. 4, the leveling system 200 does not include the rear left actuator 230 and the rear right actuator 240 (e.g., a fixed rear axle and a pivoting front axle). In other embodiments, the leveling system 200 includes the rear left actuator 230 and the rear right actuator 240, but does not include the front left actuator 210 and the front right actuator 220 (e.g., a fixed front axle and a pivoting rear axle). According to the exemplary embodiment shown in FIG. 4, the front left actuator 210, the front right actuator 220, the rear left actuator 230, and the rear right actuator 240 are hydraulic actuators driven by a hydraulic pump and controlled via various valves. In other embodiments, the front left actuator 210, the front right actuator 220, the rear left actuator 230, and the rear right actuator 240 are pneumatic actuators and/or electric actuators.

As shown in FIGS. 2 and 3, (i) the front left actuator 210 is positioned on a first lateral side or left side of the central axis 26, is coupled to the left side plate 124 of the front axle housing 110, and extends through the left actuator passage 142 of the front axle housing 110 and (ii) the front right actuator 220 is positioned on an opposing second lateral side or right side of the central axis 26, is coupled to the right side plate 126 of the front axle housing 110, and extends through the right actuator passage 144 of the front axle housing 110. As shown in FIG. 2, (i) the rear left actuator 230 is positioned on the left side of the central axis 26, is coupled to the left side plate 124 of the rear axle housing 120, and extends through the left actuator passage 142 of the rear axle housing 120 and (ii) the rear right actuator 240 is positioned on the right side of the central axis 26, is coupled to the right side plate 126 of the rear axle housing 120, and extends through the right actuator passage 144 of the rear axle housing 120.

Figure 5:
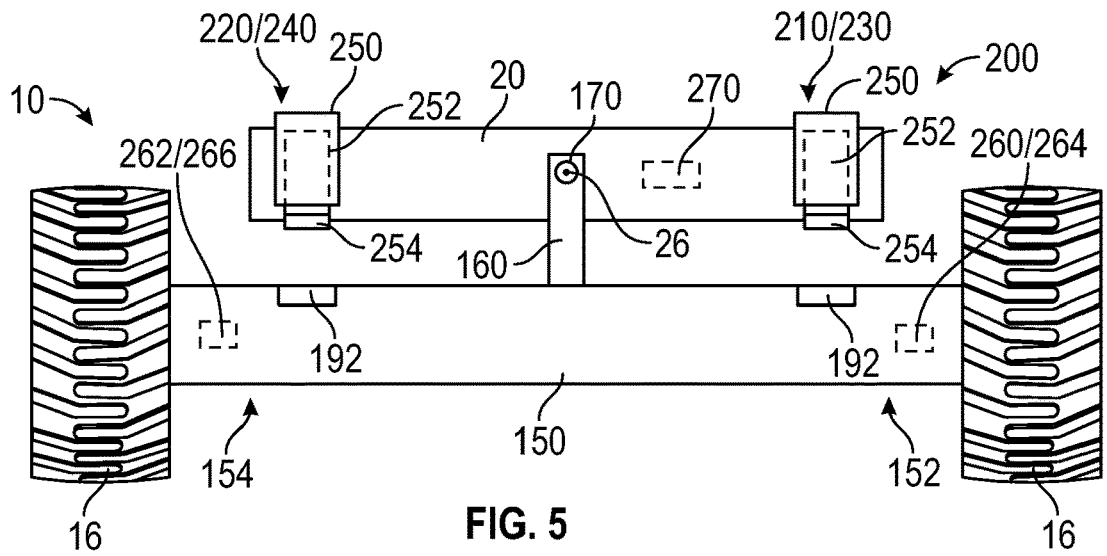
FIGS. 5-7 are various front views of the chassis and leveling system of the lift device of FIG. 1, according to various exemplary embodiments.
Figure 6:
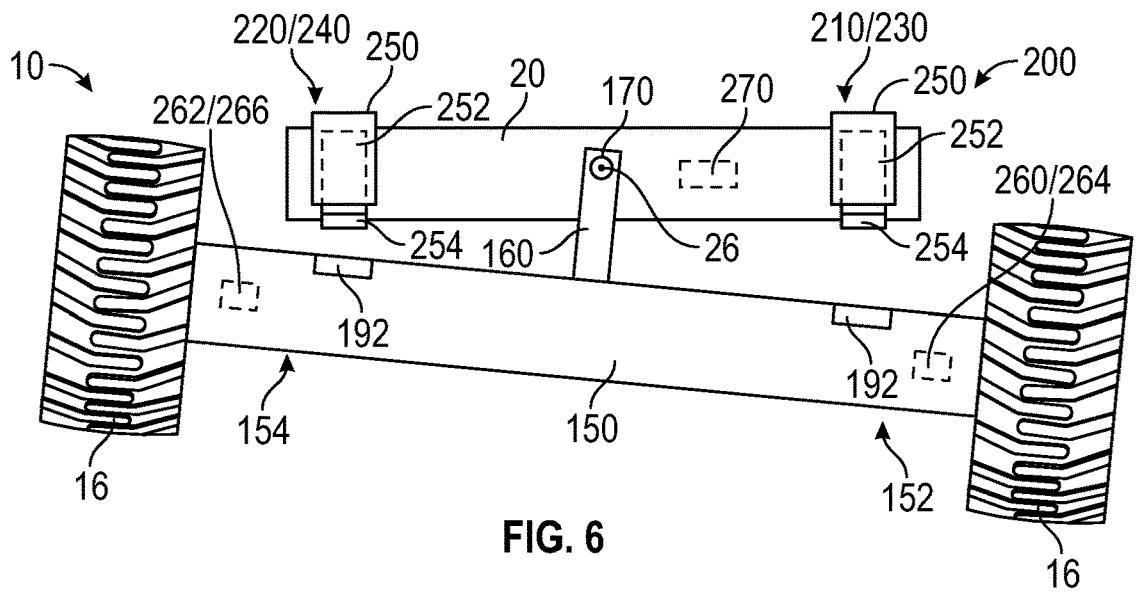
Figure 7:
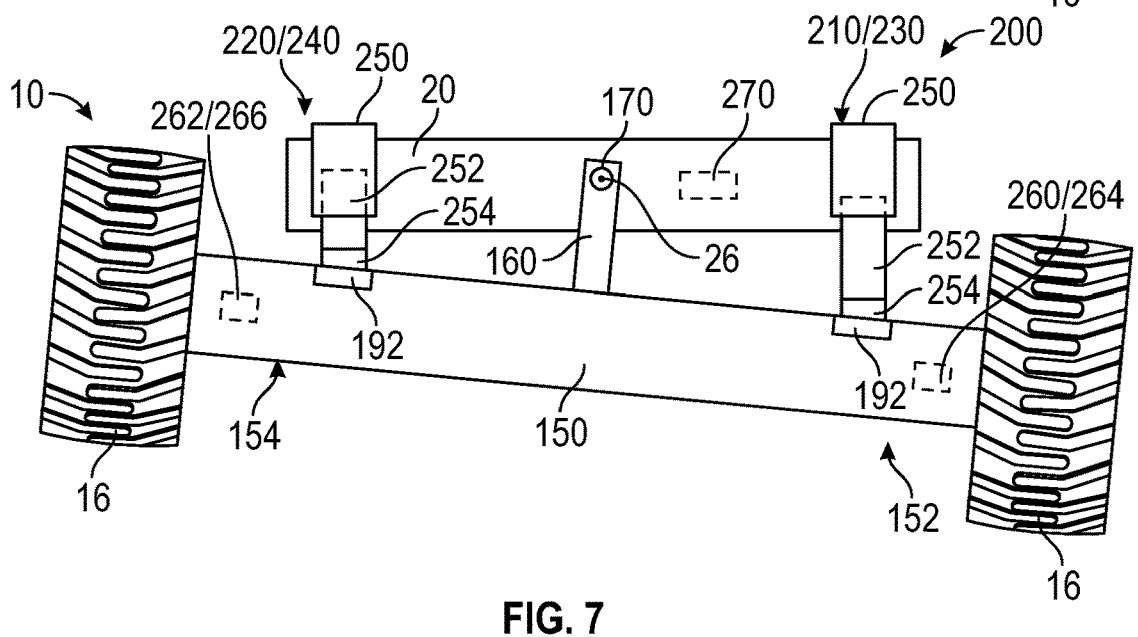

As shown in FIGS. 4-7, each of the front left actuator 210, the front right actuator 220, the rear left actuator 230, and the rear right actuator 240 includes a main body, shown as cylinder 250, and a rod, shown as rod 252, slidably received within the cylinder 250 and terminating with an interface, shown as interface 254. As shown in FIGS. 5-7, the rods 252 are selectively extendable from and retractable into the cylinders 250 such that the interfaces 254 selectively engage corresponding contact points, shown as contact points 192, positioned along the left half-shaft 152 and the right half-shaft 154 of the axles 150. In some embodiments, the interfaces 254 and/or the contact points 192 are manufactured from a rigid material (e.g., metal, steel, etc.). In some embodiments, the interfaces 254 and/or the contact points 192 are manufactured from a compliant material (e.g., hard rubber, etc.) such that the interfaces 254 and the contact points 192 engage with the faces thereof parallel with each other (e.g., to increase the area of engagement therebetween when the axles 150 are pivoted about the central axis 26 into a non-nominal position, to reduce wear, etc.). In some embodiments, the interfaces 254 and/or the contact points 192 freely pivot such that the interfaces 254 and the contact points 192 engage with the faces thereof parallel with each other (e.g., to increase the area of engagement therebetween when the axles 150 are pivoted about the central axis 26 into a non-nominal position, etc.). In an alternative embodiment, the interfaces 254 of the rods 252 are coupled (e.g., pined, etc.) to the contact points 192 of the axles 150.

As shown in FIGS. 5 and 6, the rods 252 of the front left actuator 210, the front right actuator 220, the rear left actuator 230, and the rear right actuator 240 are retracted such that the interfaces 254 are disengaged from the contact points 192 and the axles 150 freely pivot about the central axis 26. As shown in FIG. 7, the rods 252 of the front left actuator 210, the front right actuator 220, the rear left actuator 230, and the rear right actuator 240 are extended such that the interfaces 254 are engaged with the contact points 192. In such an arrangement, the front left actuator 210, the front right actuator 220, the rear left actuator 230, and the rear right actuator 240 may be extended to (i) lock the axles 150 at a desired angle and/or (ii) actively/adaptively control the angle of the axles 150. In some embodiments, the front left actuator 210, the front right actuator 220, the rear left actuator 230, and the rear right actuator 240 are controlled such that one of the axles 150 is free to pivot and the other of the axles 150 is locked. In some embodiments, the front left actuator 210, the front right actuator 220, the rear left actuator 230, and the rear right actuator 240 are controlled such that one of the axles 150 is free to pivot and the other of the axles 150 is actively controlled (i.e., the angle thereof). In some embodiments, the front left actuator 210, the front right actuator 220, the rear left actuator 230, and the rear right actuator 240 are controlled such that one of the axles 150 is locked and the other of the axles 150 is actively controlled (i.e., the angle thereof).

In some embodiments, the front left actuator 210, the front right actuator 220, the rear left actuator 230, and/or the rear right actuator 240 are extended a selected distance such that the rods 252 do not engage the contact points 192, but act as stops that limit the pivot range of the axles 150. By way of example, when the rods 252 are fully retracted, the axles 150 may pivot through a first angle range (e.g., from −10 degrees to +10 degrees, from −15 to +15 degrees, from −8 degrees to +8 degrees, from −5 degrees to +5 degrees, etc. about the central axis 26); however, the rods 252 may be partially extended to function as bump stops that effectively limit the pivot range from the first angle range to a second angle range that is less than the first angle range. In some embodiments, (i) the rods 252 of the front left actuator 210 and/or the rear left actuator 230 are extended a first distance and (ii) the rods 252 of the front right actuator 220 and/or the rear right actuator 240 are extended a second distance different than the first distance such that the axles 150 pivot a different amount to the left than the right. In some embodiments, (i) the rods 252 of the front left actuator 210 and/or the front right actuator 220 are extended a first distance and (ii) the rods 252 of the rear left actuator 230 and/or the rear right actuator 240 are extended a second distance different than the first distance such that the front axle of the axles 150 pivots a different amount than the rear axle of the axles 150.

As shown in FIGS. 2-8, the leveling system 200 includes various sensors, shown as front left load sensor 260, front right load sensor 262, rear left load sensor 264, rear right load sensor 266, and tilt sensor 270. As shown in FIGS. 2,3, and 5-7, the tilt sensor 270 is positioned on and/or within the lift base 20. In other embodiments, the tilt sensor 270 is positioned on and/or within the turntable 30. According to an exemplary embodiment, the tilt sensor 270 is configured to acquire tilt data to facilitate monitoring a tilt angle (e.g., a roll angle, a pitch angle, etc.) of the lift base 20. The tilt sensor 270 may be or include a gyroscope, an accelerometer, an inclinometer, and/or still another suitable sensor to measure the tilt angle of the lift base 20.

As shown in FIGS. 3-7, the front left load sensor 260 is directly coupled to (e.g., integrated into, etc.) the left half-shaft 152 of the front axle of the axles 150, between (i) the front left actuator 210 (and the contact point 192 associated therewith) and (ii) the tractive element 16 associated with the front left of the lift device 10. As shown in FIGS. 3-7, the front right load sensor 262 is directly coupled to (e.g., integrated into, etc.) the right half-shaft 154 of the front axle of the axles 150, between (i) the front right actuator 220 (and the contact point 192 associated therewith) and (ii) the tractive element 16 associated with the front right of the lift device 10. As shown in FIGS. 5-7, the rear left load sensor 264 is directly coupled to (e.g., integrated into, etc.) the left half-shaft 152 of the rear axle of the axles 150, between (i) the rear left actuator 230 (and the contact point 192 associated therewith) and (ii) the tractive element 16 associated with the rear left of the lift device 10. As shown in FIGS. 5-7, the rear right load sensor 266 is directly coupled to (e.g., integrated into, etc.) the right half-shaft 154 of the rear axle of the axles 150, between (i) the rear right actuator 240 (and the contact point 192 associated therewith) and (ii) the tractive element 16 associated with the rear right of the lift device 10. In some embodiments, the leveling system 200 (i) does not include the front left load sensor 260 and the front right load sensor 262 or (ii) does not include the rear left load sensor 264 and the rear right load sensor 266. According to an exemplary embodiment, the front left load sensor 260, the front right load sensor 262, the rear left load sensor 264, and the rear right load sensor 266 are configured to acquire load/strain data to facilitate monitoring a load on and/or stain within each of the left half-shafts 152 and each of the right half-shafts 154. The front left load sensor 260, the front right load sensor 262, the rear left load sensor 264, and the rear right load sensor 266 may be or include strain gauges/sensors and/or still another suitable sensor to measure the load on and/or strain within the each of the left half-shafts 152 and each of the right half-shafts 154.

As shown in FIGS. 1, 4, and 8, the lift device 10 includes a control system, shown as lift device control system 300. As shown in FIGS. 4 and 8, the lift device control system 300 includes a control module, shown as controller 310. In one embodiment, the controller 310 is configured to selectively engage, selectively disengage, control, and/or otherwise communicate with components of the lift device 10 (e.g., actively control the components thereof, etc.). As shown in FIG. 8, the controller 310 is coupled to the turntable 30, the boom 40, the steering actuators 180, the drive actuators 190, the leveling system 200 (e.g., the front left actuator 210, the front right actuator 220, the rear left actuator 230, the rear right actuator 240, the front left load sensor 260, the front right load sensor 262, the rear left load sensor 264, the rear right load sensor 266, the tilt sensor 270, etc.), and an interface, shown as user interface 320. In other embodiments, the controller 310 is coupled to more or fewer components. By way of example, the controller 310 may send and receive signals with the turntable 30, the boom 40, the steering actuators 180, the drive actuators 190, the leveling system 200, and/or the user interface 320. The controller 310 may be configured to operate the leveling system 200 in various modes and/or control the leveling system 200 to maintain the lift base 20, the turntable 30, and/or the boom 40 level relative to gravity.

The controller 310 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 8, the controller 310 includes a processing circuit 312 and a memory 314. The processing circuit 312 may include an ASIC, one or more FPGAs, a DSP, circuits containing one or more processing components, circuitry for supporting a microprocessor, a group of processing components, or other suitable electronic processing components. In some embodiments, the processing circuit 312 is configured to execute computer code stored in the memory 314 to facilitate the activities described herein. The memory 314 may be any volatile or non-volatile computer-readable storage medium capable of storing data or computer code relating to the activities described herein. According to an exemplary embodiment, the memory 314 includes computer code modules (e.g., executable code, object code, source code, script code, machine code, etc.) configured for execution by the processing circuit 312. In some embodiments, controller 310 represents a collection of processing devices (e.g., servers, data centers, etc.). In such cases, the processing circuit 312 represents the collective processors of the devices, and the memory 314 represents the collective storage devices of the devices.

In one embodiment, the user interface 320 includes a display and an operator input. The display may be configured to display a graphical user interface, an image, an icon, and/or still other information. In one embodiment, the display includes a graphical user interface configured to provide general information about the lift device 10 (e.g., speed, fuel level, warning lights, battery level, etc.). The graphical user interface may also be configured to display a current position of the leveling system 200, a current position of the boom 40, a current position of the turntable 30, an orientation of the lift base 20 (e.g., angle relative to a ground surface, etc.), stability characteristics of the lift base 20, and/or still other information relating to the lift device 10 and/or the leveling system 200.

The operator input may be used by an operator to provide commands to at least one of the turntable 30, the boom 40, the steering actuators 180, the drive actuators 190, and the leveling system 200. The operator input may include one or more buttons, knobs, touchscreens, switches, levers, joysticks, pedals, a steering wheel, or handles. The operator input may facilitate manual control of some or all aspects of the operation of the lift device 10. It should be understood that any type of display or input controls may be implemented with the systems and methods described herein.

Figure 10:
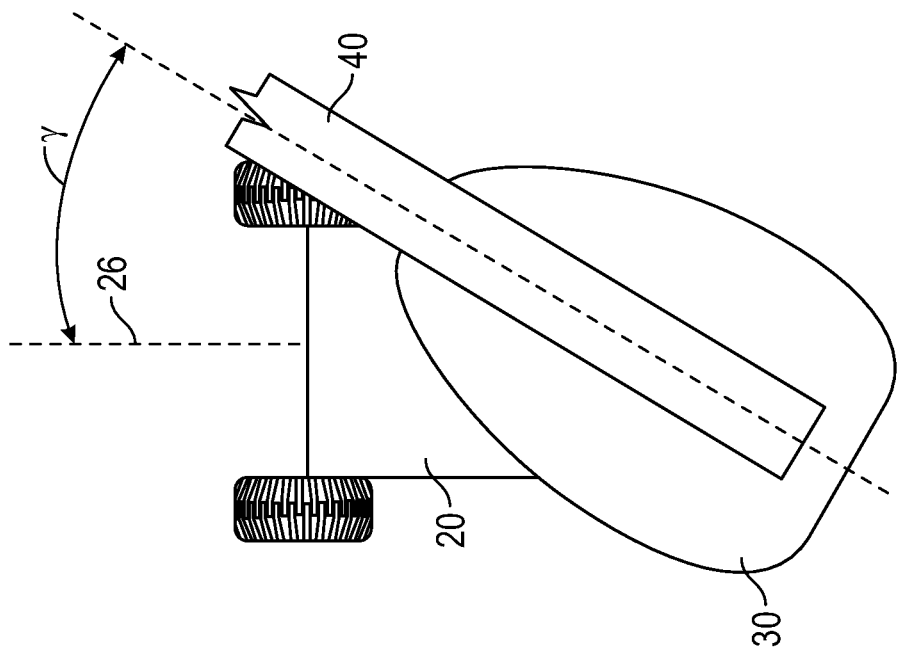
FIG. 10 is a top view of the lift device of FIG. 1 with the boom at a yaw angle, according to an exemplary embodiment.
Figure 9:
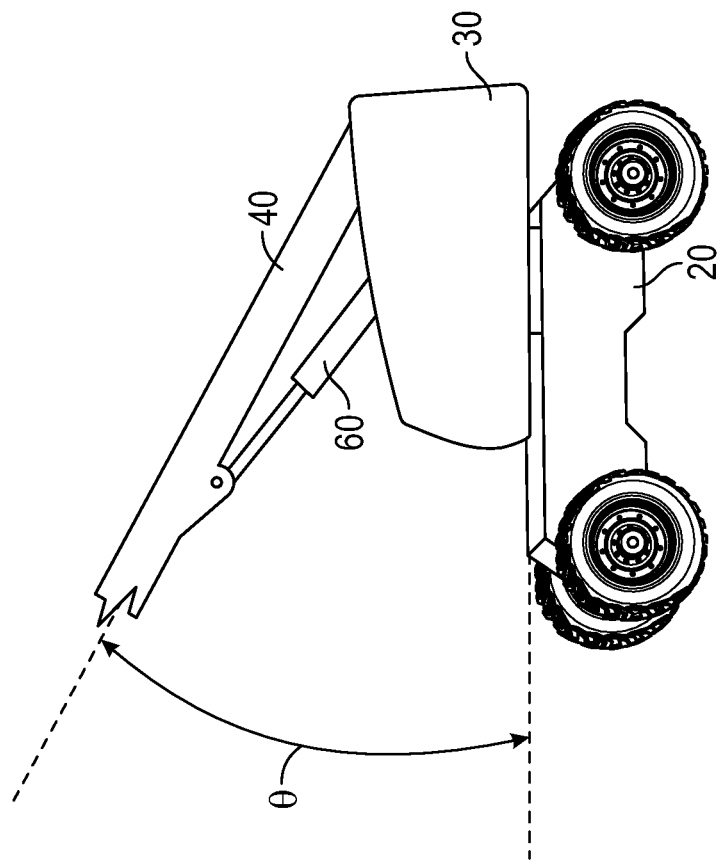
FIG. 9 is a side view of the lift device of FIG. 1 with the boom at an elevation angle, according to an exemplary embodiment.

As shown in FIGS. 9 and 10, the controller 310 is configured to monitor (i) a first angle or elevation angle, shown as angle θ, of the boom 40 pivoted above horizontal and (ii) a second angle or yaw angle, shown as angle γ, of the turntable 30 and the boom 40 rotated relative to the central axis 26. According to an exemplary embodiment, the controller 310 is configured to (i) monitor (a) the tilt data acquired by the tilt sensor 270, (b) the load/strain data acquired by the front left load sensor 260, the front right load sensor 262, the rear left load sensor 264, and/or the rear right load sensor 266, and/or (c) the position of the turntable 30 and the boom 40 (e.g., relative to a nominal, stowed position; the angle θ and the angle γ; etc.) and (ii) control the leveling system 200 based on the tilt data, the load/strain data, and/or the position of the turntable 30 and the boom 40.

The controller 310 may be configured to operate the leveling system 200 in various modes based on the tilt data, the load/strain data, the position of the turntable 30 and the boom 40, and/or whether the lift device 10 is being driven or is stationary. By way of example, the controller 310 may be configured to operate the leveling system 200 in a first mode or a free oscillation mode in response to (i) the boom 40 being "in-transport" or positioned at an angle θ less than or equal to a first angle threshold (e.g., zero degrees, five degrees, etc.), (ii) the turntable 30 and the boom 40 being centered on the central axis 26 (e.g., positioned between the front two or rear two tractive elements 16, etc.) or positioned at an angle γ less than or equal to a second angle threshold (e.g., zero degrees, five degrees, ten degrees, fifteen degrees, etc.), and/or (iii) the lift device 10 being driven. In the free oscillation mode, the controller 310 may be configured to (i) retract the rods 252 (see, e.g., FIGS. 5 and 6) or (ii) allow the rods 252 to float with the axles 150 such that the front axle and/or the rear axle of the axles 150 (depending on whether both are pivoting axles) are free to pivot about the central axis 26. The free oscillation mode allows the tractive elements 16 to remain in contact with the ground as the lift device 10 drives over uneven terrain (e.g., to substantially prevent a three-wheeling situation, etc.). In some embodiments, one of the front axle or the rear axle of the axles 150 is locked (if both are pivoting axles) during the free oscillation mode. In some embodiments, the oscillating range of the axles 150 is limited by the controller 310 during the free oscillation mode (e.g., by extending the rods 252 to function as bump stops, based on a current speed of the lift device 10, etc.).

By way of another example, the controller 310 may be configured to operate the leveling system 200 in a second mode or an active control mode in response to (i) the boom 40 being "out-of-transport" or positioned at an angle θ greater than the first angle threshold, (ii) the turntable 30 and the boom 40 not being centered on the central axis 26 or positioned at an angle γ greater than the second angle threshold, and/or (iii) the lift device 10 being driven. In the active mode, the controller 310 may be configured to (i) extend and retract the rods 252 (see, e.g., FIG. 7) such that the interfaces 254 engage the contact points 192 and (ii) actively control the pivot angle of the axles 150 about the central axis 26 to level the lift device 10 (e.g., based on the tilt data and the load/strain data; as the boom 40 is repositioned; as the lift device 10 is driven; etc.). In some embodiments, one of the front axle or the rear axle of the axles 150 is locked (if both are pivoting axles) during the active mode.

By way of still another example, the controller 310 may be configured to operate the leveling system 200 in a third mode or a locking mode in response to (i) the boom 40 being "in-transport" or positioned at an angle θ less than or equal to the first angle threshold, (ii) the turntable 30 and the boom 40 being centered on the central axis 26 or positioned at an angle γ less than or equal to the second angle threshold, and (iii) the lift device 10 not being driven. In the locking mode, the controller 310 is configured to extend the rods 252 to level the lift device 10 in its current position and then lock the rods 252 in place to prevent oscillation of the axles 150. The controller 310 may be configured to switch to the free oscillation mode in response to the lift device 10 being switched to a drive mode or switch to the active mode in response to the turntable 30 and the boom 40 being repositioned (e.g., beyond the first angle threshold, the second angle threshold, etc.)

By way of yet another example, the controller 310 may be configured to operate the leveling system 200 in a fourth mode or a reset mode in response to the tilt angle of the lift base 20 exceeding a third angle threshold (e.g., five degrees, eight degree, ten degrees, twelve degrees, fifteen degrees, etc.). In the reset mode, the controller 310 may be configured to suspend or prohibit drive functionality of the lift device 10 and lock the axles 150 until the boom 40 is returned to in-transport and centered on the central axis 26 (e.g., the boom 40 is repositioned such that the angle θ is less than the first angle threshold and the angle γ is less than the second angle threshold, etc.) to improve the stability of the lift device 10.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the lift device 10, the leveling system 200, and the lift device control system 300 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A lift machine comprising:
 a chassis having a first end and an opposing second end, the chassis defining a longitudinal center axis, the chassis including an axle housing including:
   a back plate defining a first aperture;
   a first side plate extending from a first lateral side of the back plate, the first side plate defining a first axle notch;
   a second side plate extending from an opposing second lateral side of the back plate, the second side plate defining a second axle notch;
   a front plate spaced from the back plate and extending between the first side plate and the second side plate, the front plate defining a second aperture; and
   a top plate extending between the back plate, the front plate, the first side plate, and the second side plate, the top plate defining a first actuator passage proximate the first side plate and a second actuator passage positioned proximate the second side plate;
 a turntable coupled to the chassis, the turntable selectively rotatable about a rotation axis;
 a boom coupled to the turntable;
 an axle pivotally coupled to the first end of the chassis, the axle configured to pivot about the longitudinal center axis, opposing ends of the axle extend through the first axle notch and the second axle notch, the axle including a pivot extending vertically upward from a center thereof, the pivot defining a passage that aligns with the first aperture and the second aperture;
 a pin extending through the first aperture, the passage, and the second aperture to pivotally couple the axle to the axle housing;

a first actuator coupled to the first end of the chassis and positioned on a first lateral side of the longitudinal center axis, the first actuator coupled to the first side plate and at least partially extends through the first actuator passage, wherein the first actuator is extendable to selectively engage a first contact point on the axle; and a second actuator coupled to the first end of the chassis and positioned on an opposing second lateral side of the longitudinal center axis, the second actuator coupled to the second side plate and at least partially extends through the second actuator passage, wherein the second actuator is extendable to selectively engage a second contact point on the axle.

2. The lift machine of claim 1, further comprising a controller configured to selectively control extension and retraction of the first actuator and the second actuator such that:

(a) the first actuator and the second actuator are fully retracted where ends thereof are disengaged from the first contact point and the second contact point to permit free oscillation of the axle through a first angle range;

(b) at least one of the first actuator or the second actuator is at least partially extended where the ends thereof do not actively engage the first contact point and the second contact point and thereby function as bump stops to permit free oscillation of the axle through a second angle range that is less than the first angle range;

(c) the first actuator and the second actuator are extended to actively engage the first contact point and the second contact point to lock the axle at a selected angle; and (d) the first actuator and the second actuator are actively extended and retracted to adaptively adjust a current angle of the axle based on operational parameters of the lift machine.

3. The lift machine of claim 1, wherein the axle is a first axle, further comprising a second axle coupled to the opposing second end of the chassis.

4. The lift machine of claim 3, wherein the second axle is fixed.

5. The lift machine of claim 3, wherein the second axle is configured to pivot about the longitudinal center axis.

6. The lift machine of claim 5, further comprising:

a third actuator coupled to the opposing second end of the chassis and positioned on the first lateral side of the longitudinal center axis, wherein the third actuator is extendable to selectively engage a third contact point on the second axle; and a fourth actuator coupled to the opposing second end of the chassis and positioned on the opposing second lateral side of the longitudinal center axis, wherein the fourth actuator is extendable to selectively engage a fourth contact point on the second axle.

7. The lift machine of claim 1, wherein the first actuator includes a first interface positioned to selectively engage the first contact point, and wherein the second actuator includes a second interface positioned to selectively engage the second contact point.

8. The lift machine of claim 7, wherein at least one of (a) the first interface and the second interface or (b) the first contact point and the second contact point are manufactured from a rigid material.

9. The lift machine of claim 7, wherein at least one of (a) the first interface and the second interface or (b) the first contact point and the second contact point are manufactured from a compliant material such that faces of (i) the first interface and the first contact point and (ii) the second interface and the second contact point are parallel with each other during engagement.

10. The lift machine of claim 7, wherein at least one of (a) the first interface and the second interface or (b) the first contact point and the second contact point freely pivot such that faces of (i) the first interface and the first contact point and (ii) the second interface and the second contact point are parallel with each other during engagement.

11. The lift machine of claim 1, further comprising a controller configured to control extension and retraction of the first actuator and the second actuator based on (a) a tilt angle of at least one of the chassis or the turntable, (b) a first load at the first end of the axle and a second load at the opposing second end of the axle, (c) a yaw angle of the turntable about the rotation axis relative to the longitudinal center axis, (d) an elevation angle of the boom about a pivot axis relative to the longitudinal center axis, and (e) whether the lift machine is currently being driven or is stationary.

12. A lift machine comprising:

a chassis having a first end and an opposing second end, the chassis defining a longitudinal center axis;

a turntable coupled to the chassis, the turntable selectively rotatable about a rotation axis;

a boom coupled to the turntable;

an axle pivotally coupled to the first end of the chassis, the axle configured to pivot about the longitudinal center axis;

a first actuator coupled to the first end of the chassis and positioned on a first lateral side of the longitudinal center axis, wherein the first actuator is extendable to selectively engage a first contact point on the axle;

a second actuator coupled to the first end of the chassis and positioned on an opposing second lateral side of the longitudinal center axis, wherein the second actuator is extendable to selectively engage a second contact point on the axle; and a controller configured to operate the first actuator and the second actuator in a reset mode in response to a tilt angle of at least one of the chassis or the turntable exceeding a first angle threshold, wherein, during the reset mode, the controller is configured to (a) prohibit drive functionality of the lift machine and (b) lock the first actuator and the second actuator to prevent oscillation of the axle until (i) an elevation angle of the boom is less than a second angle threshold and (ii) a yaw angle of the turntable is less than a third angle threshold.

13. The lift machine of claim 1, further comprising a controller configured to operate the first actuator and the second actuator in a locking mode in response to (a) an elevation angle of the boom being less than or equal to a first angle threshold, (b) a yaw angle of the turntable being less than or equal to a second angle threshold, and (c) the lift machine not being driven, wherein, during the locking mode, the controller is configured to extend and retract the first actuator and the second actuator to level the lift machine in its current position and then lock the first actuator and the second actuator in place to prevent oscillation of the axle.

14. The lift machine of claim 1, further comprising a controller configured to operate the first actuator and the second actuator in a free oscillation mode in response to (a) an elevation angle of the boom being less than or equal to a first angle threshold, (b) a yaw angle of the turntable being less than or equal to a second angle threshold, and (c) the lift machine being driven, wherein, during the free oscillation mode, the controller is configured to fully or partially retract the first actuator and the second actuator.

15. The lift machine of claim 1, further comprising a controller configured to operate the first actuator and the second actuator in an active control mode in response to at least one of (i) an elevation angle of the boom being greater than a first angle threshold or (ii) a yaw angle of the turntable being greater than a second angle threshold, wherein, during the active control mode, the controller is configured to actively extend and retract the first actuator and the second actuator to adaptively control a pivot angle of the axle to level the lift machine.

16. The lift machine of claim 15, wherein the controller is configured to operate the first actuator and the second actuator in the active control mode in response to (a) at least one of (i) the elevation angle of the boom being greater than the first angle threshold or (ii) the yaw angle of the turntable being greater than the second angle threshold and (b) the lift machine being driven.

17. A machine comprising:
 a chassis having a first end and an opposing second end, the chassis including an axle housing positioned at the first end thereof, the axle housing including:
  a back plate defining a first aperture;
  a first side plate extending from a first lateral side of the back plate, the first side plate defining a first axle notch;
  a second side plate extending from an opposing second lateral side of the back plate, the second side plate defining a second axle notch;
  a front plate spaced from the back plate and extending between the first side plate and the second side plate, the front plate defining a second aperture; and
  a top plate extending between the back plate, the front plate, the first side plate, and the second side plate, the top plate defining a first actuator passage proximate the first side plate and a second actuator passage positioned proximate the second side plate;
 an axle including a pivot extending vertically upward from a center thereof, the pivot defining a passage that aligns with the first aperture and the second aperture;
 a pin extending through the first aperture, the passage, and the second aperture to pivotably couple the axle to the axle housing with opposing ends of the axle extending through the first axle notch and the second axle notch;
 a first actuator coupled to the first side plate and at least partially extending through the first actuator passage, wherein the first actuator is extendable to selectively engage a first contact point on the axle; and
 a second actuator coupled to the second side plate and at least partially extending through the second actuator passage, wherein the second actuator is extendable to selectively engage a second contact point on the axle.

18. The machine of claim 17, further comprising a controller configured to selectively control extension and retraction of the first actuator and the second actuator such that:
 (a) the first actuator and the second actuator are fully retracted where ends thereof are disengaged from the first contact point and the second contact point to permit free oscillation of the axle through a first angle range;
 (b) at least one of the first actuator or the second actuator is at least partially extended where the ends thereof do not actively engage the first contact point and the second contact point and thereby function as bump stops to permit free oscillation of the axle through a second angle range that is less than the first angle range;
 (c) the first actuator and the second actuator are extended to actively engage the first contact point and the second contact point to lock the axle at a selected angle; and
 (d) the first actuator and the second actuator are actively extended and retracted to adaptively adjust a current angle of the axle based on operational parameters of the machine.

\* \* \* \* \*